United States Patent
Lannutti et al.

(10) Patent No.: US 12,404,916 B2
(45) Date of Patent: Sep. 2, 2025

(54) BELT TENSIONER WITH INTEGRATED IDLER PULLEY FOR AN ENDLESS DRIVE BELT OF AN ENGINE

(71) Applicant: DAYCO IP HOLDINGS, LLC, Roseville, MI (US)

(72) Inventors: Anthony E. Lannutti, Fayetteville, AR (US); Kevin G. Dutil, Bentonville, AR (US)

(73) Assignee: MUVIQ S.R.L., Ivrea (IT)

(*) Notice: Subject to any disclaimer, the term of this patent is extended or adjusted under 35 U.S.C. 154(b) by 0 days.

(21) Appl. No.: 18/415,983

(22) Filed: Jan. 18, 2024

(65) Prior Publication Data

US 2024/0247706 A1    Jul. 25, 2024

Related U.S. Application Data

(60) Provisional application No. 63/482,409, filed on Jan. 31, 2023, provisional application No. 63/480,889, filed on Jan. 20, 2023.

(51) Int. Cl.
*F16H 7/12* (2006.01)
*F02B 67/06* (2006.01)

(52) U.S. Cl.
CPC ........... *F16H 7/1209* (2013.01); *F02B 67/06* (2013.01)

(58) Field of Classification Search
CPC ............ F16H 2007/081; F16H 7/1218; F16H 2007/0893; F16H 7/1281; F16H 2007/084; F16H 2007/0874; F16H 2007/0865; F16H 7/0831; F16H 2007/0846

USPC .................................................. 474/134, 135
See application file for complete search history.

(56) References Cited

U.S. PATENT DOCUMENTS

| | | | | |
|---|---|---|---|---|
| 3,924,483 A | * | 12/1975 | Walker .................... | F02B 67/06 474/86 |
| 4,473,362 A | * | 9/1984 | Thomey .................. | F02B 67/06 474/135 |
| 4,525,152 A | * | 6/1985 | Speer ..................... | F16H 7/1245 474/135 |
| 4,696,663 A | * | 9/1987 | Thomey ................ | F16H 7/1218 474/135 |
| 4,784,631 A | * | 11/1988 | Henderson ............ | F16H 7/1218 474/135 |

(Continued)

OTHER PUBLICATIONS

International Search Report and Written Opinion, Application No. PCT/US24/11939, Apr. 18, 2024, p. 1-12.

*Primary Examiner* — Henry Y Liu
(74) *Attorney, Agent, or Firm* — FisherBroyles, LLP; Susan M. Oiler

(57) ABSTRACT

A belt tensioner is disclosed that has a spring case defining a receptacle for a torsion spring and having an arm extending radially outward and axially rearward therefrom and terminating with a bore configured for fastening the spring case directly to an engine. The belt tensioner has a support base non-rotationally connected to the spring case through a pivot tube. The pivot tube defines a first axis of rotation, and a pulley mount of the support base defines a second axis of rotation. The support base includes at least one fastener bore for connection to the engine. An arm is coupled to the support base for rotation about the first axis in response to a spring force applied by a torsion spring seated within the spring case and has a free end that defines a pulley mount that defines a third axis of rotation.

19 Claims, 6 Drawing Sheets

(56) References Cited

U.S. PATENT DOCUMENTS

| | | | | |
|---|---|---|---|---|
| 4,886,483 A * | 12/1989 | Henderson | F16H 7/1218 | 474/135 |
| 4,908,007 A * | 3/1990 | Henderson | F16H 7/1218 | 474/135 |
| 4,938,734 A * | 7/1990 | Green | F16H 7/1218 | 474/135 |
| 4,952,197 A * | 8/1990 | Henderson | F16H 7/1218 | 474/135 |
| 4,978,326 A * | 12/1990 | Henderson | F16H 7/1218 | 474/135 |
| 4,981,461 A * | 1/1991 | Henderson | F16H 7/1218 | 474/135 |
| 5,015,217 A * | 5/1991 | Henderson | F16H 7/1218 | 474/135 |
| 5,030,171 A * | 7/1991 | Henderson | F16H 7/1218 | 474/135 |
| 5,030,172 A * | 7/1991 | Green | F16H 7/1218 | 474/135 |
| 5,035,679 A * | 7/1991 | Green | F16H 7/1218 | 474/135 |
| 5,083,984 A * | 1/1992 | Quintus | F16H 7/1281 | 474/135 |
| 5,129,864 A * | 7/1992 | Quintus | F16H 7/1281 | 474/135 |
| 5,169,368 A * | 12/1992 | Quintus | F16H 7/1281 | 474/135 |
| 5,205,792 A * | 4/1993 | Quintus | F16H 7/1281 | 474/135 |
| 5,334,110 A * | 8/1994 | Gardner | F16H 7/1281 | 474/135 |
| 5,342,249 A * | 8/1994 | Gardner | F16H 7/1281 | 474/135 |
| 5,348,514 A * | 9/1994 | Foley | F16H 7/1218 | 474/135 |
| 5,407,397 A * | 4/1995 | Foley | F16H 7/1218 | 474/135 |
| 5,462,494 A * | 10/1995 | Rogalla | F16H 7/1218 | 474/135 |
| 5,803,850 A * | 9/1998 | Hong | F16H 7/1227 | 474/135 |
| 5,993,343 A * | 11/1999 | Rocca | F16H 7/1218 | 474/135 |
| 6,231,465 B1 * | 5/2001 | Quintus | F16H 7/1218 | 474/135 |
| 6,855,079 B2 * | 2/2005 | Cura | F16H 7/1281 | 474/135 |
| 6,863,631 B2 * | 3/2005 | Meckstroth | F16H 7/1218 | 474/135 |
| 7,118,504 B2 * | 10/2006 | Meckstroth | F16H 7/1236 | 474/134 |
| 7,186,196 B2 * | 3/2007 | Quintus | F16H 7/1218 | 474/135 |
| 7,229,374 B2 * | 6/2007 | Meckstroth | F16H 7/1218 | 474/133 |
| 7,448,974 B2 * | 11/2008 | Crist | F16H 7/1218 | 474/133 |
| 7,494,434 B2 * | 2/2009 | Mc Vicar | F16H 7/1281 | 474/134 |
| 7,837,582 B2 * | 11/2010 | Smith | F16H 7/1281 | 474/138 |
| 7,883,436 B2 * | 2/2011 | Mosser | F16H 7/1281 | 474/135 |
| 8,038,555 B2 * | 10/2011 | Pendergrass | F16H 7/1281 | 474/134 |
| 8,057,334 B2 * | 11/2011 | Kotzur | F02B 67/06 | 180/65.21 |
| 8,075,433 B2 * | 12/2011 | Quintus | F16H 7/1218 | 474/135 |
| 8,123,640 B2 * | 2/2012 | Quintus | F16H 7/1218 | 474/135 |
| 8,162,787 B2 * | 4/2012 | Gerring | F16H 7/1281 | 474/133 |
| 8,277,348 B2 * | 10/2012 | Lannutti | F16H 7/1218 | 474/135 |
| 8,337,344 B2 * | 12/2012 | Meano | F16H 7/1218 | 474/135 |
| 8,403,785 B2 * | 3/2013 | Lannutti | F16H 7/1218 | 474/135 |
| 8,460,140 B2 * | 6/2013 | Joslyn | F16H 7/1281 | 267/167 |
| 8,475,308 B2 * | 7/2013 | Crist | F16H 7/1218 | 474/135 |
| 8,852,042 B2 * | 10/2014 | Meckstroth | F16H 7/1218 | 474/135 |
| 9,709,137 B2 * | 7/2017 | Walter | B60K 25/00 | |
| 9,745,073 B2 * | 8/2017 | Whiteford | B64D 27/402 | |
| 9,976,634 B2 * | 5/2018 | Leucht | F02B 67/06 | |
| 10,520,066 B2 * | 12/2019 | Walter | F02B 67/06 | |
| 10,876,606 B2 * | 12/2020 | Singh | F16H 7/0831 | |
| 10,962,092 B2 * | 3/2021 | Liu | F16H 7/10 | |
| 11,105,402 B2 * | 8/2021 | Woo | F16H 7/12 | |
| 11,333,223 B2 * | 5/2022 | Koppeser | F16H 7/08 | |
| 11,624,426 B2 * | 4/2023 | Singh | F16H 7/0831 | 474/134 |
| 2003/0216203 A1 * | 11/2003 | Oliver | F16H 7/1281 | 474/134 |
| 2003/0216205 A1 * | 11/2003 | Meckstroth | F16H 7/1227 | 474/135 |
| 2004/0063531 A1 * | 4/2004 | Cura | F16H 7/1281 | 474/135 |
| 2004/0097311 A1 * | 5/2004 | Smith | F16H 7/1281 | 474/135 |
| 2006/0058136 A1 * | 3/2006 | Mosser | F16H 7/1281 | 474/135 |
| 2006/0287146 A1 * | 12/2006 | McVicar | F16H 7/1281 | 474/134 |
| 2010/0222169 A1 * | 9/2010 | Meano | F16H 7/1218 | 474/135 |
| 2011/0207568 A1 * | 8/2011 | Smith | F16H 7/1281 | 474/135 |
| 2013/0260933 A1 * | 10/2013 | Dutil | F16H 7/1218 | 474/135 |
| 2014/0038758 A1 * | 2/2014 | Jindai | F16H 7/1218 | 474/135 |
| 2015/0345597 A1 * | 12/2015 | Walter | F16H 7/1218 | 474/134 |
| 2018/0010670 A1 * | 1/2018 | Leucht | F16H 7/1245 | |
| 2022/0099165 A1 * | 3/2022 | Burcar | F16H 7/1281 | |
| 2022/0099168 A1 * | 3/2022 | Lee | B64C 27/00 | |
| 2022/0275852 A1 * | 9/2022 | Lannutti | F16H 7/0831 | |

* cited by examiner

BELT TENSIONER WITH INTEGRATED IDLER PULLEY FOR AN ENDLESS DRIVE BELT OF AN ENGINE

RELATED APPLICATIONS

This application claims the benefit of U.S. Provisional Application No. 63/480,889, filed, Jan. 20, 2023 and U.S. Provisional Application No. 63/482,409, filed Jan. 31, 2023, which are both incorporated herein by reference in their entirety.

TECHNICAL FIELD

The present invention relates generally to belt tensioners and more particularly to a belt tensioner with an integrated idler pulley, where the belt tensioner has a spring case with a radially extending anchor terminating with a mounting hole configured for direct fastening to an engine mount.

BACKGROUND

Front end accessory drive systems of engines include an endless belt operatively driven by a crank shaft and various pulleys some of which may drive accessories. A belt tensioner is typically present in such drive systems. One example drive system and an example belt tensioner are disclosed in U.S. application Ser. No. 17/034,676, which is included herein as FIGS. 1A and 1B. This belt tensioner has three mounting holes in the support bracket and a pivot tube of the belt tensioner offset from the mounting holes. FIG. 1B includes the force path for the hub load applied by the belt to the pulley as a dashed-dotted line. It has been determined that the pivot tube can pitch in the hub load direction when load is applied, which can cause the spring case to roll resulting in bending forces acting on the support bracket. While the belt tensioner is effective and meets safety standards, it is desirable to improve the same by reducing or eliminating the bending forces experienced by the belt tensioner, especially in the support bracket. Thus, there is a need for an improved belt tensioner.

SUMMARY

In all aspects, a belt tensioner is described that has a spring case defining a receptacle for a torsion spring that has an arm extending radially outward and axially rearward therefrom, which terminates with a bore configured for fastening the spring case directly to an engine. The belt tensioner has a support base non-rotationally connected to the spring case by a pivot tube that defines a first axis of rotation. The support base has a pulley mount that defines a second axis of rotation and at least one bore configured for fastening the support base to the engine also. The belt tensioner has an arm having its first end coupled to the pivot tube for rotation about the first axis relative to the spring case and support base and having a second end that defines a pulley mount that defines a third axis of rotation. The belt tensioner has a torsion spring having a first end operatively coupled to the support base and a second end operative coupled to the arm such that the torsion spring biases the arm in a belt engaging direction relative to the support base.

In all aspects, the pivot tube is positioned outside an area defined by the bores. The pivot tube can have a knurled first end fixedly connected to the spring case and a knurled second end fixedly connected to the support base.

In all aspects, the torsion spring can be a flat wire spring. The first end of the spring is attached to the spring case, and the first end of the arm includes a pivot tube-receiving feature to which the second end of the spring is operatively attached.

In all aspects, the belt tensioner has a first pulley operatively connected to the pulley mount of the support base for rotation about the second axis and a second pulley operatively connected to the second end of the arm for rotation about the third axis.

In all aspects, a spring bushing seated between the arm and the torsion spring, and a damper connected to the arm for rotation therewith and in operational engagement with the support base. In one embodiment, the damper is keyed to the first end of the arm for rotation with the arm. The spring bushing can have a center ring and an outer ring connected to one another by a plurality of spokes, and has an upper outermost axial flange seated against an exterior surface of the spring case and a lower outermost axial flange seated against an exterior surface of the arm.

In all aspects, the spring case can have an arm travel limiting feature defining a preselected number of degrees of rotation for the arm and the arm has a stop configured to engage the arm travel limiting feature.

DETAILED DESCRIPTION

Figure 1A:
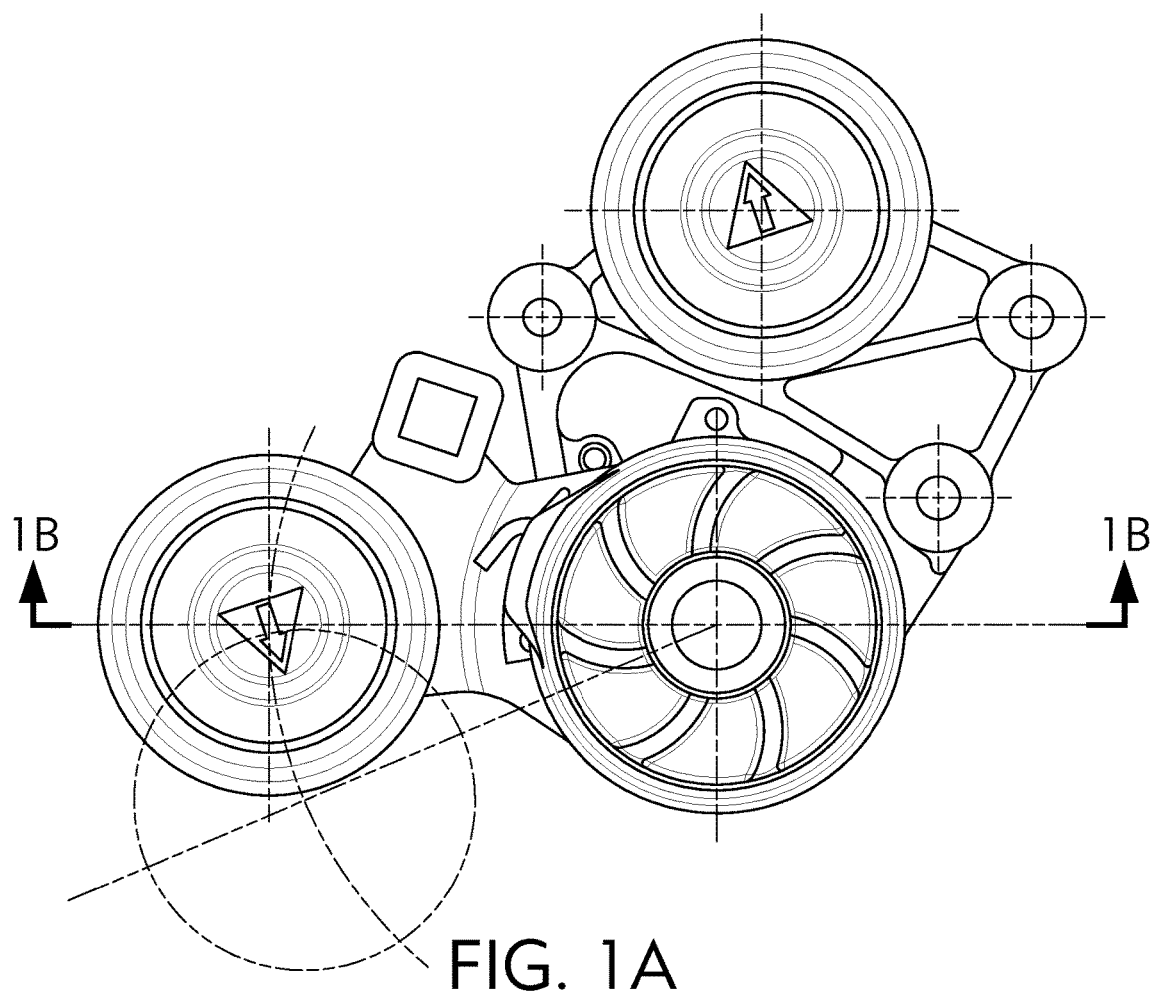
FIG. 1A is a top plan view of a prior art belt tensioner having an integrated idler pulley.
Figure 1B:
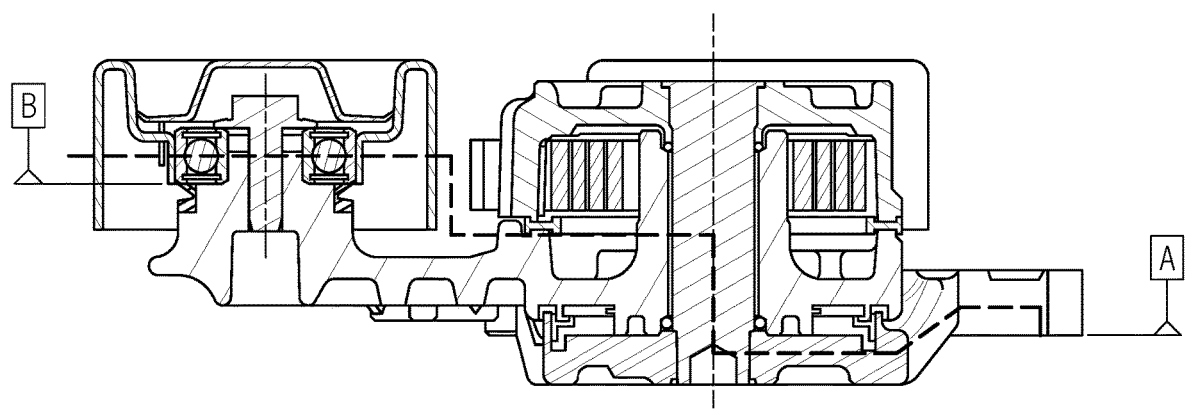
FIG. 1B is a longitudinal, cross-sectional view of the belt tensioner portion taken along line A-A in FIG. 1A.

The following detailed description will illustrate the general principles of the invention, examples of which are additionally illustrated in the accompanying drawings. In the drawings, like reference numbers indicate identical or functionally similar elements.

Figure 1C:
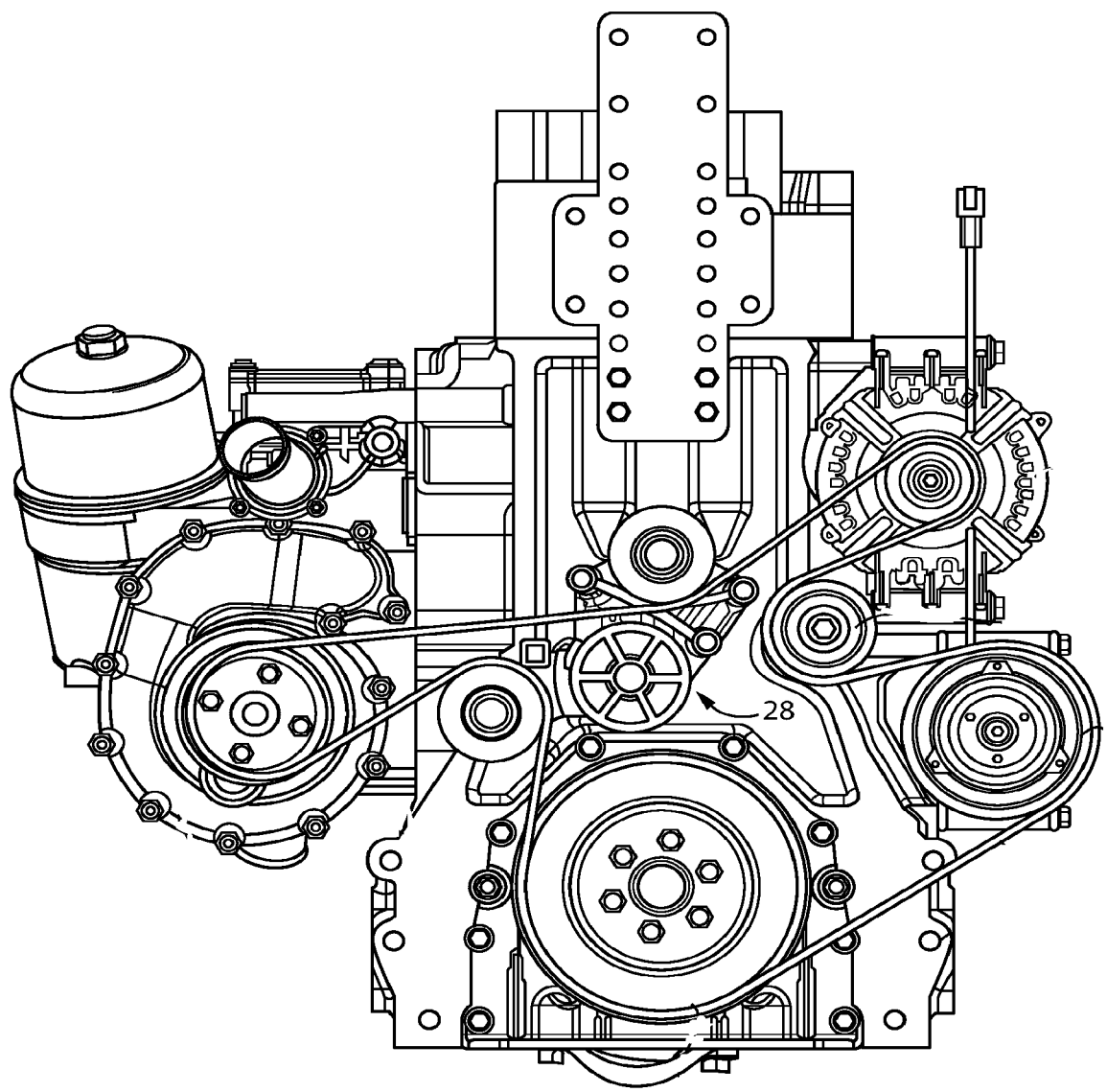
FIG. 1C is a front plan view of an internal combustion engine system of the prior art.

Referring to FIGS. 2-5, a first embodiment of a belt tensioner 100 for providing a predetermined amount of tension upon a belt (labeled in FIG. 2), often found in a front end accessory drive (FEAD) of an engine system, is disclosed. The belt tensioner 100 is useful in a FEAD such as the transmission belt system exemplified in FIG. 1C taken from U.S. application Ser. No. 17/034,676 in place of belt tensioner 28. Herein, referring to FIGS. 2 and 3, the belt tensioner 100 has a main body 102 that includes an arm 106 pivotally mounted to a support base 108 by a pivot tube 110 defining a first axis ($X_1$) of rotation about which the arm pivots or rotates and a torsion spring 112 operatively coupled between the arm 106 and the support base 108 that biases the arm in a belt-tensioning direction T. The support base 108 is fixed to the pivot tube 110, has a pulley mount 120 (best seen in FIGS. 4 and 5) that defines a second axis ($X_2$) of rotation, and at least one bore 122 configured for fastening the support base to an engine.

Figure 2:
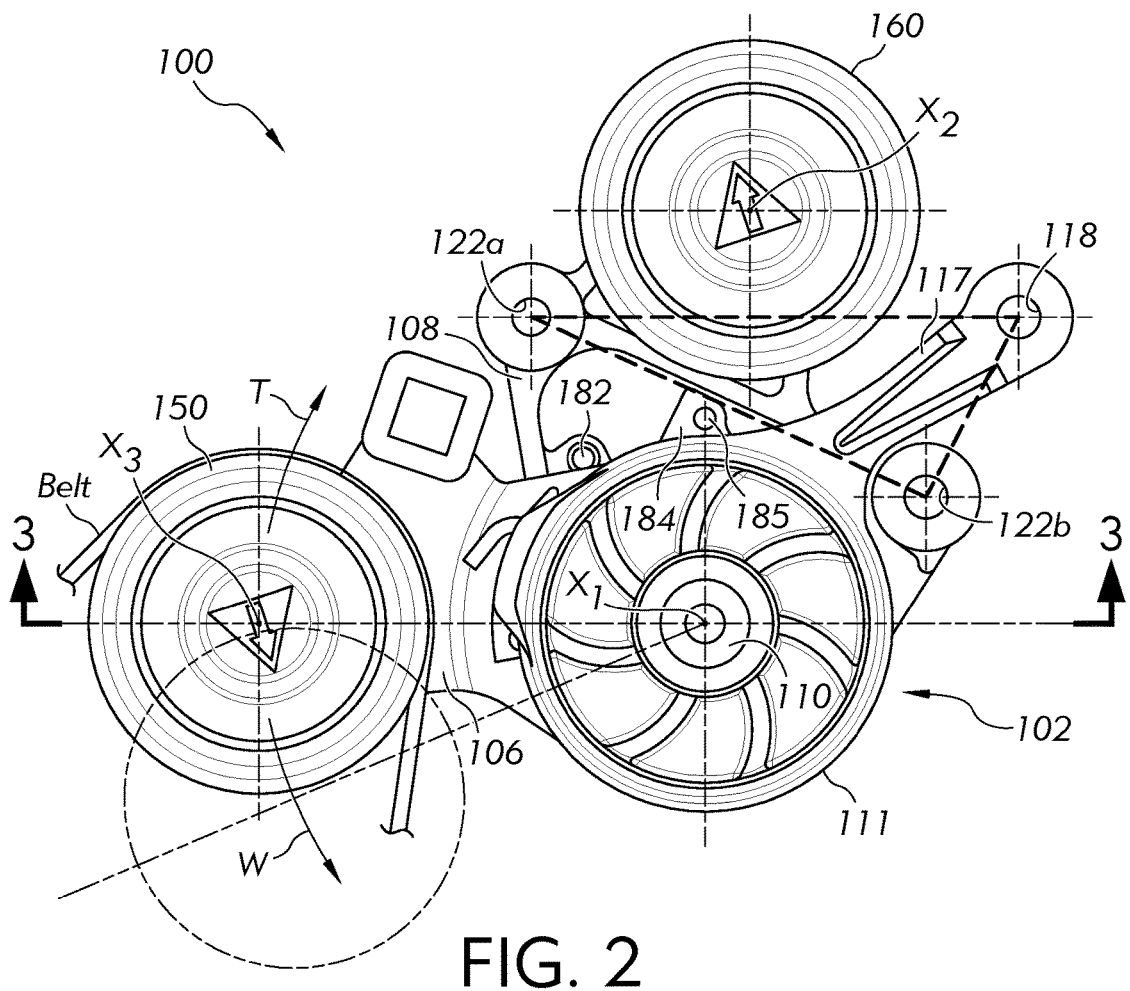
FIG. 2 is a top plan view of a first embodiment of a belt tensioner having an integrated idler pulley.
Figure 3:
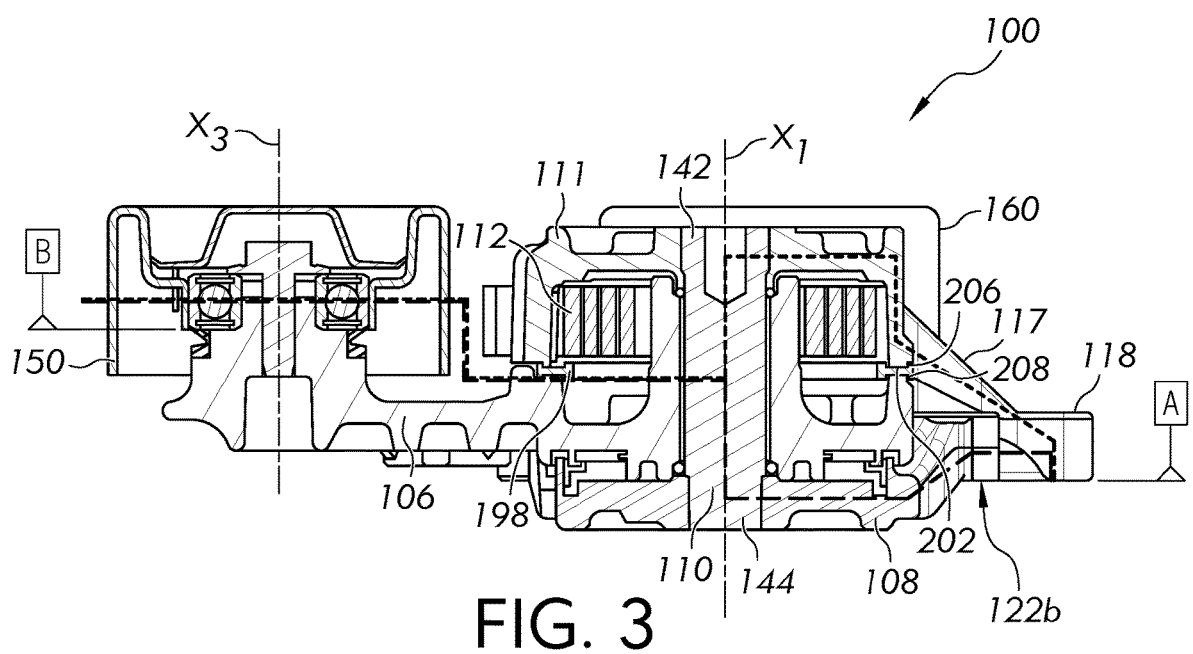
FIG. 3 is a longitudinal, cross-section through the belt tensioner portion of FIG. 2 taken along line 3-3.
Figure 4:
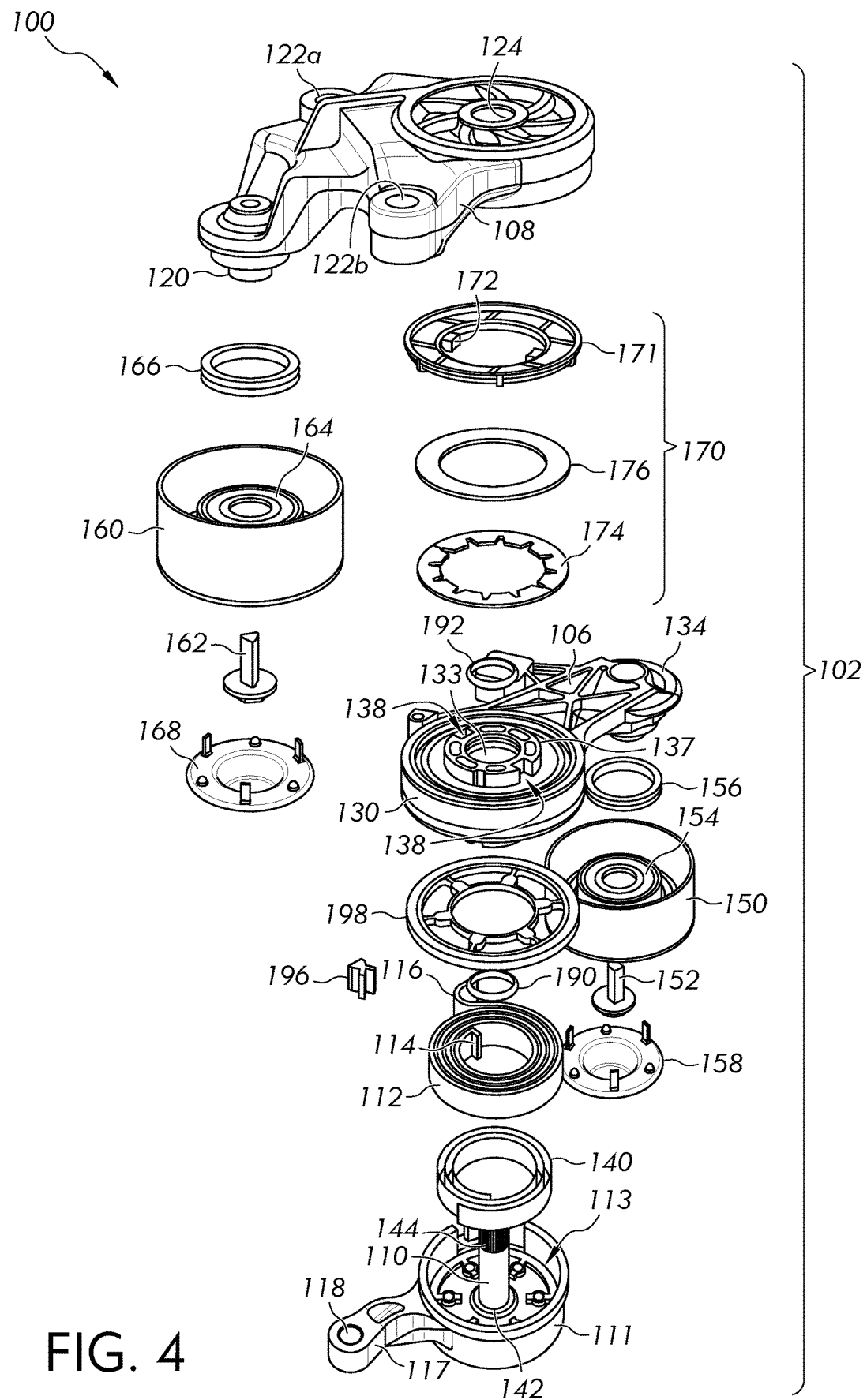
FIG. 4 is an exploded view of the belt tensioner of FIG. 2 from a bottom perspective view.
Figure 5:
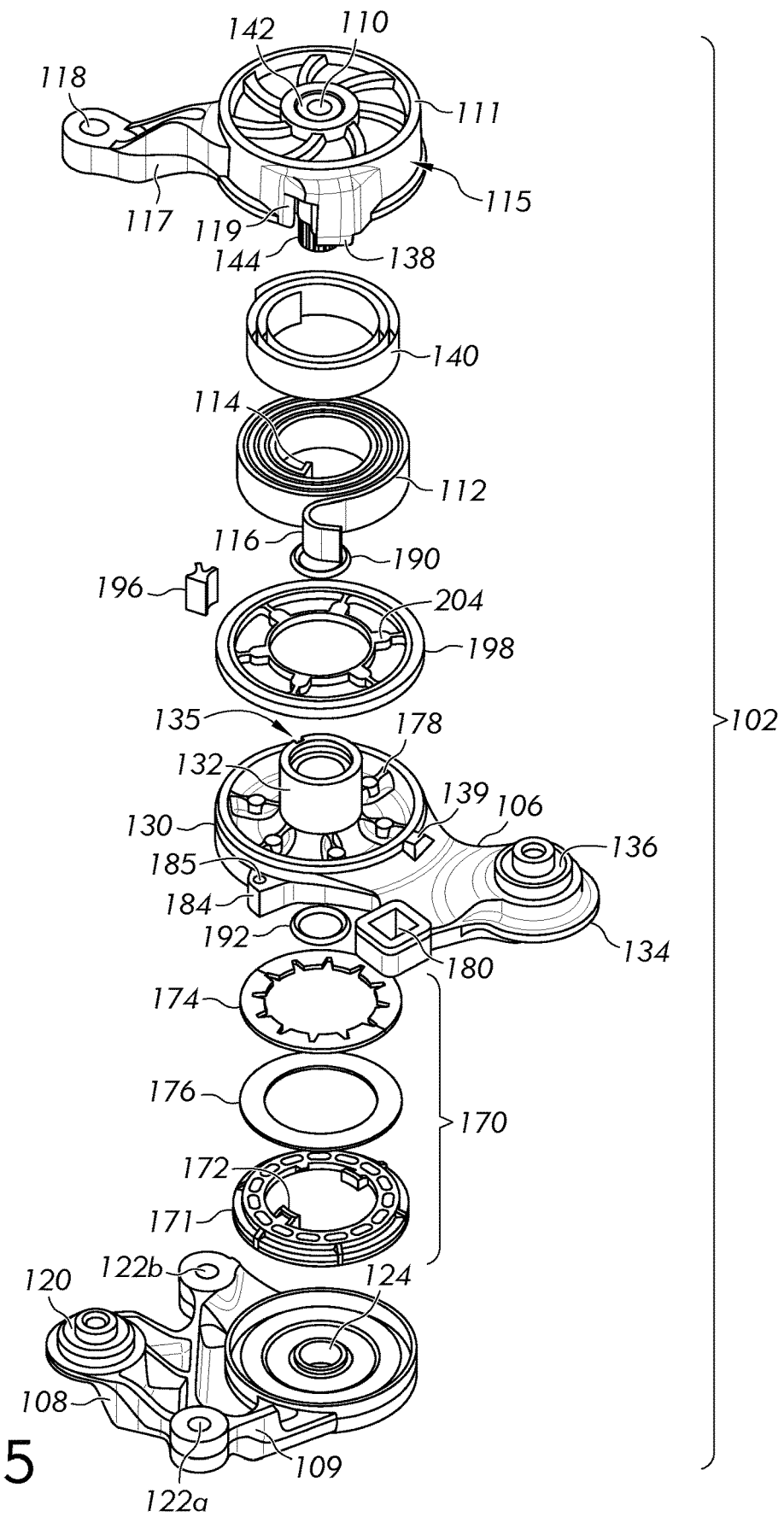
FIG. 5 is an exploded view of the main body of the belt tensioner of FIG. 2 from a top perspective view.

As labeled in FIGS. 4 and 5, the arm 106 has a first end 130 defining a pivot tube-receiving feature 132 and has a second end 134 that defines a pulley mount 136 that defines a third axis of rotation ($X_3$). The main body 102 includes a spring case 111 defining a receptacle 113 for the torsion spring 112. The spring case 111 has an arm 117 extending radially outward and axially rearward therefrom (as best seen in FIGS. 2 and 5) that terminates with a bore 118 configured for fastening the spring case directly to an engine, i.e., independent of the support base (the bore 118 does not rest upon the support base or align with a bore in the support base). The fastening directly to the engine can be to the cylinder block or to a housing or other structure supported upon the cylinder block. A bolt received in bore 118 passes through the arm 117 and fastens to the engine. The spring case 111 is non-rotationally connected to the support base 108 via the pivot tube 110, but both have at least one anchor point for direct fastening to the engine. The embodiment of FIGS. 2-5 has two bore 122a, 122b in the support base 108 and one bore 118 in the arm 117 of the spring case.

Figure 6:
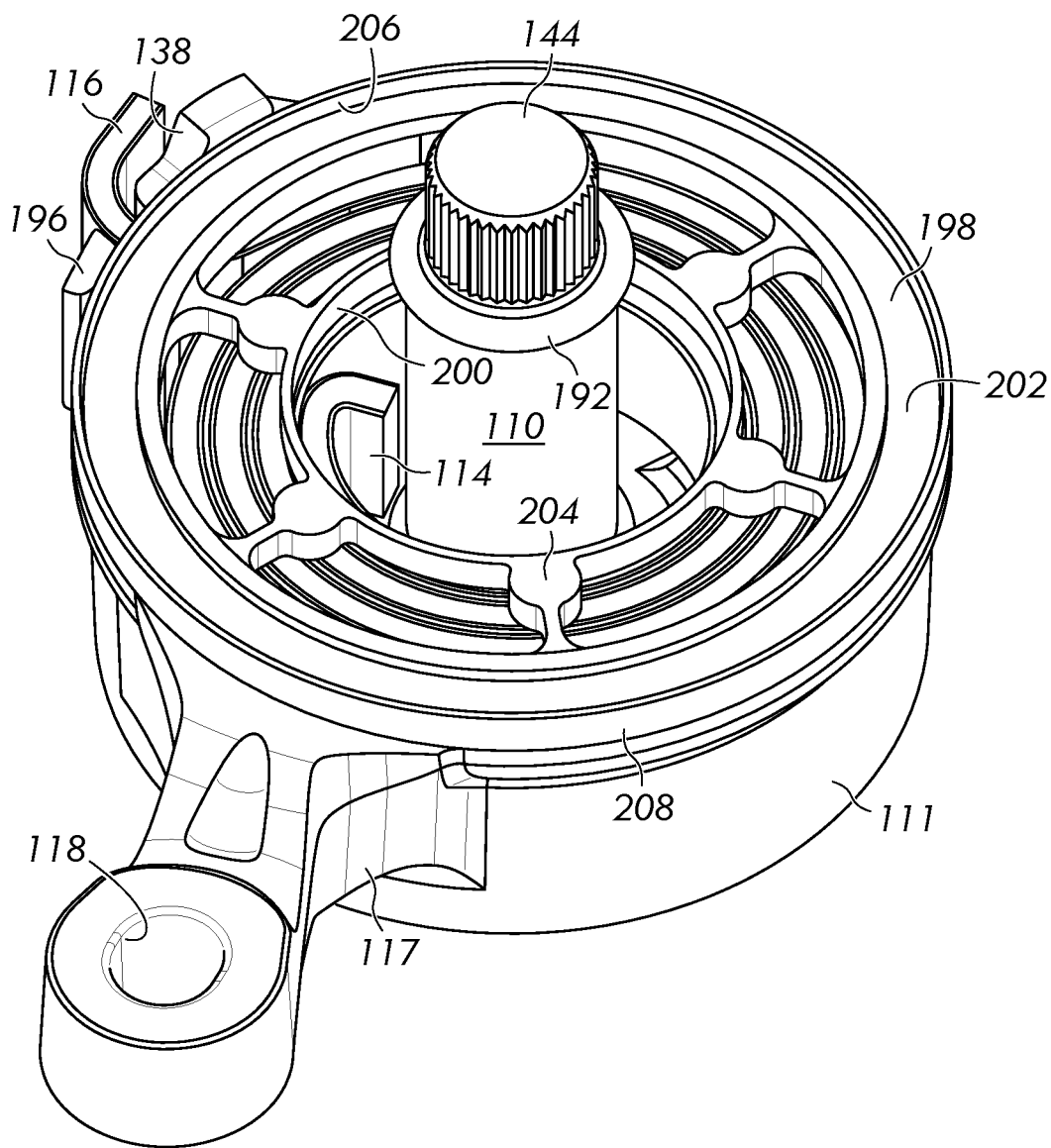
FIG. 6 is a bottom perspective view of the spring case having seated therein a torsion spring and a spring bushing.

As shown in FIG. 2, the pivot tube 110 is mounted to the support base 108 at a position that is outside the area defined by the bores 112a, 122b and 118. When the fasteners are bolts, this can be described as a position outside of the bolt pattern. As seen in FIGS. 5 and 6, the second end 144 of the pivot tube 110, which may be knurled, seats in a mounting bore 124 of the support base 108 and is fixedly attached thereto. The fixed attachment of the pivot tube 110 to the support base 108 can be a radially riveted connection. In this improved belt tensioner 100, the first end 142 and the second end 144 of the pivot tube 110 are both anchored to the engine. The first end 142 is anchored by its fixed connection to the spring case 111. The second end 144 is anchored by its fixed connection to the support base 108. As shown in FIG. 3, the arm will flex under the hub load, but the force path (the bold dashed lines) is shared between the spring case 111 and the support base 108. More specifically, the force path divides at the pivot tube 110 and a portion of the force is directed to the first end 142 of the pivot tube 110 fixedly connected to the spring case 111 and from there to the arm 117 of the spring case to its fixed attachment point at mounting bore 118 to the engine. The other portion of the force path is directed to the second end 144 of the pivot tube 110 fixedly connected to the support base 108 to its fixed attachment point (at least) at mounting bore 122b to the engine. The result is reduced flexing in the support base 108 because the spring case 111 shares the load back to datum A. As such, the belt tensioner has improved alignment control due to reduced component flexing under the hub load force.

Turning now to FIG. 4, a first pulley 150 is mounted for rotation to the second end 134 of the arm 106 by a bolt 152 extending through the hub 154 of the pulley 150 and into the pulley mount 136 of the arm 106. The pulley 150 is preferably journaled to the second end 134 by a roller bearing 154. A dust cover 158 is coaxially mounted to the pulley 150 to protect the roller bearing 154 from debris and contamination. In the first embodiment, the dust cover is seated over the head of the bolt. In another embodiment, the dust cover may be seated between the head of the bolt 152 and the hub of the pulley 150. To seal the bottom of the pulley 150 against debris and contamination an annular seal 156, such as a V-ring, X-ring, or O-ring seal, can be seated in operative engagement with the roller bearing 154 and the arm 106.

Still referring to FIG. 4, a second pulley 160, referred to as an idler pulley, is mounted to the support base 108 at the pulley mount 120 for rotation about the second axis ($X_2$). The second pulley 160 is mounted thereto by a bolt 162 extending through the hub 164 of the pulley 160 and into the pulley mount 120. The pulley 160 is preferably journaled to the pulley mount 120 by a roller bearing 164. A dust cover 168 is coaxially mounted to pulley 160 to protect the roller bearing 164 from debris and contamination. In the first embodiment, the dust cover is seated over the head of the bolt. In another embodiment, the dust cover may be seated between the head of the bolt 162 and the hub of the pulley 160. To seal the bottom of the second pulley 160 against debris and contamination an annular seal 166, such as a V-ring, X-ring, or O-ring seal, can be seated in operative engagement with the roller bearing 164 and the support base 108.

Referring to FIGS. 4 and 5, the arm 106 has a pivot tube-receiving feature 132 (best seen in FIG. 5) protruding from the first end 130. An annular pivot bushing 133 is seated inside the pivot tube-receiving feature 132. The annular pivot bushing 133 is bounded by an upper sealing member 190 and a lower sealing member 192, which prevent contaminants and debris from entering the pivot tube-receiving feature 132. The sealing members 190, 192 can be a V-ring, X-ring, O-ring seals or any equivalent thereto. The pivot tube-receiving feature 132 includes a spring seat 135 for the first end 114 of the torsion spring 112. The opposing side of the first end 130 of the arm 106 includes an annular protruding hub 137 that includes either a key or keyway for non-rotational connection to a damper 170, which has a mating key or keyway 172.

The damper 170 includes a damper ring 171 keyed to the annular protruding hub 137 of the arm 106. A washer 176 can be present between the damper ring 171 and a biasing member 174. The biasing member can be a Bellville spring as shown or any other type of biasing member suitable for applying an axial force on the damper ring 171 to keep it in frictional contact with the support base 108. The damper 170 urges the arm towards the spring bushing to take up any clearances as the bushings wear during general operation and component stack up that might occur during assembly. During normal tensioning, when a belt presses against the pulley 150 of the arm 106, the arm will rotate about the pivot axis $X_1$ thereby winding the torsion spring 112. The torsion spring after being wound will apply spring torque against the arm 106 to move, hold, or press the arm and pulley against the belt. When the arm 106 rotates about the pivot axis $X_1$ in either direction, the frictional contact between the support base 108 and the damper 170 reduces or acts to minimize the rotation of the arm. The damper's operative engagement with the arm 106 and frictional contact with the support base provides frictional symmetric damping.

The arm 106 can include a tool receptacle 180 (FIGS. 2 and 5). A tool can be inserted to apply torque to the arm to move the pulley 150 away from the belt for example during installation of the belt tensioner 100, which is referred to in FIG. 2 by arrow W (winding of the torsion spring). Referring now to FIGS. 2 and 5, the support base 108 includes a bore 182 that can be aligned with a tab 184 of the arm 106 that defines a bore 185, and once aligned a locking pin (not shown) can be inserted to hold the arm 106 in an install position.

Referring again to FIG. 5, the spring case 111 has an arm travel limiting feature 138, which may be referred to as a stop, defining a preselected number of degrees of rotation for the arm 106. The arm 106 has a protrusion or a second travel limiting feature 139, which may also be referred to a stop, configured to engage the arm travel limiting feature 138 of the spring case. When these two stops are engaged, the arm is in a free arm position. Additionally, the tab 184 of the arm 106 is configured as a second stop of the arm. The tab 184 can engage a partial rib 109 of the bracket 108 when the arm 106 is in an install position.

Referring again to FIGS. 3-5, the torsion spring 112 applies a torsional spring force on the arm 106 in the direction shown by arrow T (FIG. 2) representing a belt engaging or belt tensioning direction, such that the second end 134 of the arm 106 applies a corresponding tension force upon the belt. In the illustrated embodiments, the torsion spring 112 is a flat wire spring having a spring tape 140 interleaved between the coils thereof, but the belt tensioner is not limited thereto. In other embodiments, the torsion spring 112 can be a coil spring, such as a round wire coil spring. The use of spring tape 140 reduces frictional wear of the spring or other negative effects of friction such that spring collapse is reduced. The flat wire torsion spring 112 has an inner spring end 114 attached to the arm 106, more specifically to the pivot-tube receiving portion 132 and an outer spring end 116 attached to the spring case 111, more specifically seated in an open notch 119 in an outer wall 115 of the spring case 111 (best seen in FIG. 5). The inner and outer spring ends 114, 116 can be bent to define hooks, tangs, etc. to enhance the attachment of the spring to the respective pivot tube and arm. When assembled, a plug 196 can be inserted into the open notch 119 next to the outer spring end 116 of the torsion spring 112 to block contaminants and debris from entering the spring case. The open notch 119 defines a spring abutment feature against which the outer spring end 116 is operatively seated to bias the arm 106 in the belt tensioning direction.

Referring now to FIGS. 3 and 6, the tensioner includes a spring bushing 198. The spring bushing 198 is seated between the arm 106 and the torsion spring 112. The spring bushing 198 has a center ring 200 and an outer ring 202 connected to one another by a plurality of spokes 204. The spring bushing 198 includes an upper outermost axial flange 206 and a lower outermost axial flange 208. The upper outermost axial flange 206 is seated against an exterior surface of the arm 106 and the lower axial outermost flange 208 is seated against an exterior surface of the spring case 111. This bushing thus creates a seal between the arm and spring case to prevent contaminants and debris from entering the main body 102 of the tensioner 100. This configuration renders the outer ring 202 to be T-shaped when viewed in longitudinal cross-section, as shown in FIG. 3. Alternately, the outer ring 202 can be H-shaped when viewed in longitudinal cross-section, thereby providing sealing against both the interior surface and the exterior surface of both the spring case and the arm. The spokes 204 rest against the torsion spring 112. The surface of the arm facing the pivot bushing can include a plurality of fingers protruding therefrom that are in a spaced arrangement to have one each between immediately neighboring spokes 204. The spokes 204 and fingers 178 of the arm (labeled in FIG. 5) can either or both functions to maintain the spring tape 140 between the coils of the torsion spring 112, i.e., prevent the spring tape 140 from migrating out from between the coils during operation of the tensioner.

The arm 106, support base 108, pivot tube 110, and/or spring case 111 are often made of metallic material such as solid steel, aluminum, or powdered metal and some plastics if of sufficient strength. These parts may be die-cast parts. The torsion spring 112 may be manufactured from steel, but other suitable alternative materials (or combination of materials/components) to construct such components are also contemplated. The bushings are typically a wear resistant plastic. The wear resistant plastic can be, but is not limited to, all polyamides (PA) including 66 nylon, 6 nylon, 11 nylon, 12 nylon, 69 nylon, 612 nylon, and 610 nylon, polyamide 46 nylon; polyethermides (PEI); polysulfones (PSU); polyethersulfones (PES); polyoxymethylenes (POM), or acetals; polyetheretherketones (PEEK); polyphenylene sulfides (PPS); polypthalamides (PPS), or amodels; polyphenylene sulfides (PPO); and amorphous nylons. While the bushings in this embodiment are wear resistant plastic and PTFE coated steel, it is within the scope of the invention to use other suitable bushing materials or bearing structures. The bushing provides a bearing surface for the rotation of elements of the tensioner about the pivot axis.

With reference to FIGS. 4-6, during assembly, the spring case 111 is mounted in a support of a supporting machine (not shown), the pivot tube 110 can be inserted and fixed to the spring case 111 now or before it was placed in the support. A first sealing member 190 is seated on the pivot tube 110 most proximate the interior surface of the spring case. The torsion spring with its spring tape 140 is seated in the receptacle 113 (best seen in FIG. 4) with the outer spring end 116 in the open notch 119 (best seen in FIG. 6). The plug 196 can be inserted now or after the tensioner's main body is assembled. Next, the spring bushing 198 is seated on the torsion spring with the outer ring's upper flange 208 seated against an exterior surface of the spring case. An annular pivot bushing 133 is either inserted into the pivot tube-receiving feature 132 of the arm 106 or is seated on the pivot tube. The pivot tube-receiving feature 132 is then seated over the pivot tube 110 and a second sealing member 192 is seated on the pivot tube 110 against the annular pivot bushing. The damper 170 is seated in keyed engagement with the arm 106 and then the support base 108 is seated on the pivot tube 110. In this assembly process, the support base 108 is the last component of the main body 102 that is assembled. The pivot tube 110 is then fixedly connected to the support base 108. The fixed connection can be produced by radially riveting the pivot tube to the support base or by another suitable fastening means. Fastening means can include any type of welding technique, including standard solder welding, spring welding, laser welding. Fastening means can include a bolt, or other fastener, adhesive, and other equivalents to any and all of the fastening means.

With reference to FIGS. 2 and 4, one benefit to the order of assembly of the tensioner 100 is that since the mounting bore 122*b* of the support base and the mounting bore 118 of the arm 117 of the spring case 111 are coplanar, see the plane line at datum A in FIG. 3, the portion of the arm 117 defining the bore 118 can act as a registration stop and an alignment feature for the tooling used to press the support base 108 onto the pivot tube 110.

After the main body of the tensioner is assembled, the assembly can be flipped over and the pulleys 150 and 160 can be installed. Alternately, the pulley 150 can already be installed on the arm before it is seated on the pivot tube, and pulley 160 can already be installed on the support base before it is seated on the pivot tube.

The belt tensioners discussed herein have numerous advantages, many of which have been already discussed above. Some additional advantages are provided in this paragraph. A flat wire spring is advantageous because it has a lower torque per degree of rotation and less degrees of variation than a round wire spring. A flat wire spring also has less resonance issues than a round wire spring and the use of spring tape between the spring's coils can further reduce noise. Additionally, the flat wire spring reduces the tensioner's axial height (H), which can be advantageous in installing the tensioner in various motor configurations. The important advantage of the belt tensioner discussed herein is the reduction in the flexing or bending forces acting on the support base.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A belt tensioner comprising:
   a spring case defining a receptacle for a torsion spring, the spring case comprising a first arm extending radially outward and axially rearward therefrom and terminating with a bore configured for fastening the spring case directly to an engine;
   a support base non-rotationally connected to the spring case by a pivot tube that defines a first axis of rotation, the support base having a pulley mount that defines a second axis of rotation and at least one bore configured for fastening the support base to the engine;
   a second arm having a first end coupled to the pivot tube for rotation about the first axis relative to the spring case and support base and having a second end that defines a pulley mount that defines a third axis of rotation; and
   a torsion spring having a first end operatively coupled to the support base and a second end operative coupled to the second arm, wherein the torsion spring biases the second arm in a belt engaging direction relative to the support base.

2. The belt tensioner of claim 1, wherein the pivot tube is positioned outside an area defined by the bores.

3. The belt tensioner of claim 1, wherein the torsion spring is a flat wire spring.

4. The belt tensioner of claim 1, wherein the first end of the spring is attached to the spring case.

5. The belt tensioner of claim 4, wherein the first end of the second arm includes a pivot tube-receiving feature, and the second end of the spring is operatively attached to the pivot tube-receiving feature.

6. The tensioner of claim 1, further comprising a first pulley operatively connected to the pulley mount of the support base for rotation about the second axis and a second pulley operatively connected to the second end of the second arm for rotation about the third axis.

7. The belt tensioner of claim 1, wherein the pivot tube has a knurled first end fixedly connected to the spring case and a knurled second end fixedly connected to the support base.

8. The belt tensioner of claim 1, further comprising a spring bushing seated between the second arm and the torsion spring, and a damper connected to the second arm for rotation therewith and in operational engagement with the support base.

9. The belt tensioner of claim 8, wherein the damper is keyed to the first end of the second arm for rotation with the second arm.

10. The belt tensioner of claim 8, wherein the spring bushing comprises a center ring and an outer ring connected to one another by a plurality of spokes.

11. The belt tensioner of claim 10, wherein the spring bushing includes an upper outermost axial flange and a lower outermost axial flange, wherein the upper outermost axial flange is seated against an exterior surface of the spring case and the lower axial outermost flange is seated against an exterior surface of the second arm.

12. The belt tensioner of claim 1, wherein the spring case has an arm travel limiting feature defining a preselected number of degrees of rotation for the second arm and the second arm has a stop configured to engage the arm travel limiting feature.

13. A system comprising:
   a belt tensioner comprising:
      a spring case defining a receptacle for a torsion spring, the spring case comprising a first arm extending radially outward and axially rearward therefrom and terminating with a bore configured for fastening the spring case directly to an engine;
      a support base non-rotationally connected to the spring case by a pivot tube that defines a first axis of rotation, the support base having a pulley mount that defines a second axis of rotation and at least one bore configured for fastening the support base to the engine;
      a first pulley operatively seated on the pulley mount of the support base;
      a second arm having a first end coupled to the pivot tube for rotation about the first axis relative to the spring case and support base and having a second end that defines a pulley mount that defines a third axis of rotation;
      a second pulley operatively seated on the pulley mount of the second arm;
      a torsion spring having a first end operatively coupled to the support base and a second end operative coupled to the second arm, wherein the torsion spring biases the second arm in a belt engaging direction relative to the support base; and
   an endless belt engaging the first pulley and the second pulley.

14. The system of claim 13, wherein the pivot tube is positioned outside an area defined by the bores.

15. The system of claim 13, wherein the torsion spring is a flat wire spring.

16. The system of claim 13, wherein the first end of the spring is attached to the spring case, the first end of the second arm includes a pivot tube-receiving feature, and the second end of the spring is operatively attached to the pivot tube-receiving feature.

17. The system of claim 13, wherein a first end of the pivot tube is fixedly connected to the spring case and a second end of the pivot tube is fixedly connected to the support base.

18. The system of claim 13, further comprising a spring bushing seated between the second arm and the torsion spring, and a damper connected to the second arm for rotation therewith and in operational engagement with the support base.

19. The system of claim 18, wherein the damper is keyed to the first end of the second arm for rotation with the second arm.

\* \* \* \* \*